United States Patent [19]
Miyosawa et al.

[11] 4,064,028
[45] Dec. 20, 1977

[54] PROCESS FOR ELECTROCOATING

[75] Inventors: Yoshiaki Miyosawa; Sueo Umemoto, both of Hiratsuka, Japan

[73] Assignee: Kansai Paint Co., Ltd., Japan

[21] Appl. No.: 573,756

[22] Filed: May 1, 1975

Related U.S. Application Data

[63] Continuation-in-part of Ser. No. 294,096, Oct. 2, 1972, abandoned.

[30] Foreign Application Priority Data

Nov. 18, 1971   Japan .................................. 46-91936

[51] Int. Cl.$^2$ ..................... C25D 13/06; C25D 13/10
[52] U.S. Cl. ................................................. 204/181
[58] Field of Search ........................................ 204/181

[56] References Cited

U.S. PATENT DOCUMENTS

| | | | |
|---|---|---|---|
| 3,175,964 | 3/1965 | Watanabe et al. | 204/181 |
| 3,290,235 | 12/1966 | Gilchrist | 204/181 |
| 3,839,252 | 10/1974 | Bosso et al. | 204/181 |

*Primary Examiner*—Howard S. Williams
*Attorney, Agent, or Firm*—Ostrolenk, Faber, Gerb & Soffen

[57] ABSTRACT

A coating composition for electrodeposition contains water soluble or water dispersible resin and at least one water soluble oxy-acid salt being selected from the group consisting of stannates, molybdates, tungstates, vanadates and borates, or a mixture of said water soluble oxy-acid salts. The coating formed from said composition on a metallic surface by electrodeposition is excellent in the adhesiveness and anti-corrosive property.

8 Claims, No Drawings

PROCESS FOR ELECTROCOATING

The present application is a continuation-in-part of our copending application Ser. No. 294,096, filed Oct. 2, 1972 now abandoned.

This invention relates to a coating composition for electrodeposition to a metallic surface.

Further, the invention relates to the coating composition for electrodeposition which contains water soluble oxy-acid salt.

Still further, the invention relates to the coating composition for electrodeposition which contains water soluble or water dispersible resin and at least one water soluble oxy-acid salt being selected from the group consisting of stannates, molybdates, tungstates, vanadates and borates.

In the well known prior art, a protective coating on a metallic surface is formed through immersing the metallic article in an aqueous medium containing a water soluble or water dispersible resin, and the article as an anode is applied with direct current to cause electrodeposition of the resin, thereby depositing the resin in film form on the surface of metallic article. However, the resins which can be used for such purpose are not satisfactory with regard to the adhesiveness to the metallic surfaces. Further, if the coating composition for electrodeposition has relatively good adhesiveness to the metal, the anti-corrosive property of the protective coating obtained from such composition is still insufficient especially when it is employed for a long period under outdoor conditions. Therefore, in the prior art, the metallic surface is treated with a pretreating composition for metal surface prior to such electrodeposition in order to eliminate the above-mentioned defects. For example, it is well known that iron surfaces or zinc galvanized iron surface is treated with a phosphate conversion composition or chromate conversion composition prior to the application of the coating composition by electrodeposition. Further, in the coating of aluminum or aluminum alloy, the adhesiveness of the coating film is improved by treating the aluminum with a chromic conversion composition or by anodic oxidation without sealing the micropores, followed by the electrodeposition of coating materials.

However, these methods have a serious defect in common in that the series of processes cannot be carried out with a single treating bath and a rinsing step is required between such treatments. Accordingly, it is inconvenient to treat economically a large amount of metallic articles with the method. Further, for example, in the process of the anodic oxidation of aluminum, the shapability of the treated aluminum article is inferior because the oxide film has no flexibility, and therefore it is not suitable for the treatment of the aluminum article which is to be shaped after the coating. Consequently, the conventional methods involve many problems to be solved not only in the treating processes but also in the quality of the treated articles.

Also, a process for painting metal which improves the anti-corrosive property employing a single electrodeposition bath is previously known. The process comprises a sequence of anodic application of an organic film to metal followed by anodic treatment of the metal with an oxy-acid salt such as chromate or phosphate in a concentration of 0.1 to 2.0% by weight through the initially-deposited film. However, the degree of improvement in anti-corrosive property is not always satisfactory.

The inventors of the present invention have carried out several extensive studies in order to eliminate the above-mentioned defects in the methods of the prior art, and as the result, the principal concept of the present invention has been found. That is, the coating composition for electrodeposition of the invention is of an aqueous medium containing water soluble or water dispersible resin which is mixed with one or more of water soluble oxy-acid salts being selected from the group consisting of stannates, molybdates, tungstates, vanadates and borates in an amount of 0.1 to 0.8% by weight of the resin solid component of the coating composition for electrodeposition.

The procedure of the electrodeposition in the present invention is as follows. A metallic article is immersed in the coating composition of the invention containing the above-mentioned water soluble or water dispersible resin, hereinafter referred to as "water dispersible resin", and said water soluble oxy-acid salts, and then electric current is applied. Said metal article is used as the anode. The oxy-acid anion of the water soluble oxy-acid salt is by far large in the value of the "electric charge/molecular weight" compared with said water dispersible resin which is dissolved in molecular state or dispersed in articles into water, so that the property of electrophoresis of the oxy-acid anion surpasses. Therefore, the oxy-acid anion moves to the surface of the anode preferentially to said coexisting water dispersible resin and the anion discharges and changes to non-ionic chemical species. The chemical activities of the oxy-acid salts used in the composition of the invention are very high, so that the salts react with the metal of the anode to form compounds, thereby the surface of the metallic article can be covered and protected by the chemically converted and dense thin layer. At the same time, the water dispersible resin is deposited on the thin layer as a top-coat resulting in an organic coating by electrodeposition in one operation. The characteristic features of the present invention are not only the fact that the process is simple as the pretreatment step and the electrode position step of the water dispersible resin are carried out at the same time, but also the fact that the process is efficacious and the chemically converted layer formed is dense and comparatively thick because the treatment is carried out by electrochemical reaction. These are far superior to the method in which the metallic article is only dipped into the aqueous solution of the oxy-acid or the method in which such solution is sprayed on the surface of the metallic article. Especially if the article to be coated is made of chemically active metal such as aluminum, the rate of chemical conversion is very high, so that the effects of the invention become further notable. That is, when an article made of aluminum or aluminum alloy, or an article covered with aluminum or aluminum alloy is treated with the composition of the invention, the two protective layers consisting of the insoluble chemical conversion of the metallic base and the electrodeposited film from water dispersible resin are formed on the surface, and the combination of the two layers shows excellent adhesiveness to the substrate and anti-corrosive property as compared with the conventionally electrodeposited film from the coating composition in which the oxy-acid salts is not used. Thereby, the qualitative problems which are involved the pretreatment for the surface of aluminum and the like as well as the problem with regard to the simplification of the pretreating process have been solved simultaneously and satisfactorily.

Also, it is very effective to treat the articles made of iron or steel with the electrodeposition coating composition of the present invention. Particularly in the case that the surface of the articles has been treated with surface treating agent such as zinc phosphate solution as in the prior art, a chemically converted and duplicated layer is formed by application of the composition, and a coating system having an extremely high adhesive property is effectuated.

The inventors have investigated with regard to the components of the chemically converted layer which is formed by electrodepositing the coating composition of the invention to the metallic surface, however, the details of the components have not been determined. Meanwhile, from the results of X-ray analysis about the coating on an aluminum article being disclosed in the following, it has been ascertained that the chemically converted layer is composed of inorganic compound containing the metallic element in the anionic part of the oxy-acid salt used in the composition. That is, a solution containing 10% resin solids was prepared by dissolving an acrylic resin having free carboxylic groups made water soluble by neurtralizing with triethylamine and a water soluble melamine-formaldehyde resin. To respective portions of the above solution were added 0.3, 0.5 or 0.8% of the resin solids by weight of potassium stannate ($K_2SnO_3.3H_2O$), ammonium heptamolybdate ( $(NH_4)_6Mo_7O_{24}$), ammonium paratungstate ( $(NH_4)_{10}W_{12}O_{41}$), ammonium metavanadate ($NH_4VO_3$) or potassium metaborate ($KBO_2$). Then, the solutions thus prepared were adjusted to pH 8.0 using triethylamine to obtain baths for electrodeposition. A degreased aluminum plate was immersed as an anode into each of the above baths and direct current was supplied to cause electrodeposition. The applied voltages were 60 volts in the 0.3% (by weight) salt solutions, 55 volts in the 0.5% (by weight) salt solutions and 45 volts in the 0.8% (by weight) salt solutions, the temperature of the baths was 30 ± 0.5° C, and the time of current supplied was 1 minute. Thereafter, the aluminum plates were taken out, rinsed with water, and the water on the surfaces was wiped off. Then the plates were dipped into methylene chloride repeatedly to dissolve off the resinous coating film on each surface until no organic substance could be observed through reflective infrared spectrophotometry. Each surface of the aluminum test plates was smooth, but the metallic luster was lost and gave the color of pale yellow or white, and slight increase of weight was observed.

Further, the converted layers of the above-obtained test plates except those treated with coating composition containing the potassium metaborate were analyzed by X-ray fluorometry apparatus of 50 kV, 30 mA, using tungsten tubes (chromium tubes were used for the test plates treated with coating composition containing the tungstate). The resultant relative intensities of the detected characteristic X-ray are shown in the following Table 1.

Table 1

| Oxy-acid Salt | Detected X-ray | Relative Intensities of Detected Characteristic X-rays (counts/second) Concentration of Salt (%) | | | |
|---|---|---|---|---|---|
| | | 0 | 0.3 | 0.5 | 0.8 |
| $K_2SnO_3$ | SnKα | 0 | 150 | 150 | 180 |
| $(NH_4)_6Mo_7O_{24}$ | MoKα | 0 | 50 | 80 | 130 |
| $(NH_4)_{10}W_{12}O_{41}$ | WLα | 0 | 40 | 40 | 70 |
| $NH_4VO_3$ | VKα | 0 | 30 | 60 | 80 |

As the X-ray fluorometry of the test plates treated with coating composition containing the potassium metaborate could not be carried out, they were analyzed chemically by colorimetry, and as the result, the existence of boron was ascertained. Though the precision of the analysis was not sufficient, it was understood that the amounts of boron were approximately in proportion to the concentrations of the salt added into the baths employed.

The water soluble oxy-acid salts which can be used for the composition of the present invention may be, for example, as follows:

Stannates:
  Lithium stannate: $Li_2SnO_3$
  sodium stannate: $Na_2SnO_3.3H_2O$, and
  potassium stannate: $K_2SnO_3.3H_2O$.

Molybdates:
  Molybdates which are represented by the general formula: $xM_2O.yMoO_3.nH_2O$, where M is Li, Na, K or ($NH_4$), $x$ is an integer from 1 to 5, $y$ is an integer from 1 to 12, and n is zero or a integer from 1 to 10, for example,
  lithium molybdate: $Li_2MoO_4$,
  sodium molybdate: $Na_2MoO_4$,
  potassium molybdate: $K_2MoO_4.5H_2O$,
  ammonium heptamolybdate: $(NH_4)_6Mo_7O_{24}.4H_2O$,
  sodium phosphomolybdate: $Na_3PO_4.12MoO_3$, and
  ammonium phosphomolybdate: $(NH_4)_3PO_4.12MoO_3.3H_2O$.

Tungstates:
  Orthotungstates which are represented by the general formula: $M_2O.WO_3.nH_2O$, where M is Li, Na, K or ($NH_4$) and $n$ is zero or a integer from 1 to 5, for example,
  lithium tungstate: $Li_2WO_4$,
  sodium tungstate: $Na_2WO_4.2H_2O$, and
  potassium tungstate: $K_2WO_4$;
  metatungstates which are represented by the general formula: $M_2O.4WO_3$, where M is the same as the above, for example, sodium metatungstate: $Na_2W_4O_{13}$; and paratungstates which are presented by the general formula : $5M_2O.12WO_3$, where m is the same as the above, for example,
  sodium partungstate: $Na_{10}W_{12}O_{41}$; and
  ammonium pentatungstate: $(NH_4)_4W_5O_{17}.5H_2O$,
  ammonium heptatungstate: $(NH_4)_6W_7O_{24}.6H_2O$,
  sodium phosphotungstate: $Na_3PO_4.12WO_3.18H_2O$, and
  barium borotungstate: $Ba_9[B(W_2O_7)_6]_2$.

Vanadates:
  Lithium orthovanadate: $Li_3VO_4$,
  sodium orthovanadate: $Na_3VO_4$,
  lithium metavanadate: $LiVO_3.2H_2O$,
  sodium metavanadate: $NaVO_3.4H_2O$,
  potassium metavanadate: $KVO_3$,
  ammonium metavanadate: $NH_4VO_3$ or $(NH_4)_4V_4O_{12}$, and
  sodium pyrovanadate: $Na_4V_2O_7$.

Borates:
  Lithium metaborate: $LiBO_2.2H_2O$,
  Lithium tetraborate: $Li_2B_4O_7.5H_2O$,
  sodium metaborate: $NaBO_2$,
  sodium tetraborate: $Na_2B_4O_7.10H_2O$,
  sodium decaborate: $Na_2B_{10}O_{16}.10H_2O$,
  sodium perborate: $NaBO_2.H_2O_2.3H_2O$,
  sodium borate-hyrogen peroxide adduct: $Na_2B_4O_7.H_2O_2.9H_2O$, sodium boroformate: $NaH_2BO_3.2H_2O$,
potassium metaborate: $KBO_2$,
potassium tetraborate: $K_2B_4O_7.5H_2O$,
ammonium tetraborate: $(NH_4)_2B_4O_7.4H_2O$, and
ammonium biborate: $(NH_4)HB_4O_7.3H_2O$.

These water soluble oxy-acid salts may be used alone or in combination of two or more of them so long as they do not produce a precipitate by the interaction. Thereby, the characteristic of each salt can be made complementary and multiplicative. There is no apprehension of forming a precipitate if salts having the same kind of anion portions are used together, however, when salts having different kinds of anion portions are used together, a precipitate is sometimes produced. For example, there are possibilities of forming precipitate in the combinations of stannates and molybates, stannates and tungstates molybdates and tungstates, and tungstates and borates, while other combinations may be almost safe with regard to the formation of precipitate.

The water dispersible resins used for the composition of the present invention may be the ordinarily known ones and the use of a special resin is not necessary. For example, any of synthetic resins such as epoxy resin, melamine-formaldehyde resin, alkyd resin, polyester, acryic resin, polybutadiene, natural resin and fatty oil derivative may be used. The resins are treated to be dissolvable or dispersible in water, and the trunk of the resin molecules are made migratory to the anode by electropheresis. The method to disperse, dissolve and stabilize said water dispersible resins is not particularly restricted, that is, either of the well known methods such as the method to add the resin molecules with neutral hydrophilic groups, the method to add acid functional groups such as carboxyl groups and neutralize partially or wholly to form the soluble salt, the method to use surface active agents, especially anionic surfactants, or method to use ultrasonic vibration, and the combinations thereof can be used. The amount of the water dispersible resins to be dissolved or dispersed in water may be from 4 to 10% by weight. If the amount of the resin is less than 4%, effective electrodeposition cannot be carried out, and if it is more than 10%, the viscosity of the bath becomes high to an undue extent and a smooth electrodeposited film is hardly obtained. Further, the loss of the water dispersible resin increases in the use of such high concentration because the excessive solution in the bath is attached to the surface of the article to be treated.

The amount of the oxy-acid salts such as stannates to be added into the water dispersion of the water dispersible resin may be in the range of 0.1 to 0.8% by weight, preferably 0.3 to 0.8% by weight of the resin solids. In cases where two or more of the oxy-acid salts are used, the total amount thereof is put within the above-mentioned range. If the salt having high solubility is used with an amount of more than 0.8% by weight, the water dispersible resin tends to coagulate due to the salting out by said salt as an electrolyte, and the specific conductivity of the bath becomes too high. Therefore, the smooth electrodeposited film cannot be obtained, which is not preferable. Meanwhile, if the salt having poor solubility is used in an amount more than its solubility, salt particles in the solid state are deposited with the water dispersible resin, which cause several troubles. If the amount of the salt added to the resin dispersion is less than 0.1%, the effective chemically converted layer can be hardly formed. Therefore the object of the present invention cannot be expected. These salts may be added by any procedure such as, for example, a separately prepared salt solution is poured into the solution or dispersion of the water dipersible resin, or a definite amount of solid salt is added directly and the composition is stirred enough to dissolve the added salt.

In order to obtain the coloring effect or decorative effect of the coating, suitable dyestuff or pigment can be dissolved or dispersed into the coating composition of the present invention. Further, a small amount of organic solvent can be added to the composition for the purpose of improving the smoothness of the coating.

Using the composition in the bath prepared as above containing the water dispersible resin and so forth, the protective coating can be formed on the metallic surface of the article to be electrodeposited by the procedure as follows. That is, the article having metallic surface is immersed into said composition in the bath and connected to the positive electrode. Another electroconductive material is immersed in the composition in the same bath and connected to the negative electrode and then direct current is supplied between them. The voltage of said direct current is in the range of 30 to 300 volts. If the voltage is lower than 30 volts, the electrophoresis is hardly caused to occur, and on the other hand if the voltage is higher than 300 volts, it is not desirable because there is some fear of the formed coating being ruptured.

The temperature of the composition in the bath may be in the range of between the solidifying point and the boiling point, however, temperatures between 20° C and 40° C are preferable in order to minimize the undesirable change of the composition caused by the evaporation of water from the bath, and to obtain the coating having good properties.

It is desirable to apply the electric current in the range of 30 seconds to 10 minutes for the process. When the electric voltage is kept at a constant level, the supply of electric current can be terminated after the electric current is decreased and become constant. Or, allow voltage may be suppied in the initial stage and the voltage is raised gradually with the passage of time, thereby the electric current is also increased, and when the rate of increase of the current is lowered, the electric supply can be terminated.

In this manner, a piled up layer composed of a chemically converted layer on the metallic surface and water dispersible resin coating layer is formed on the layer. Then, the obtained coating layer is rinsed with water to remove the accompanied composition in the bath, and the coating layer is heated to cure the water dispersible resin. The heating conditions should be different according to the kind and grade of the resin as used, however, the temperature may be generally in the range of 130 to 300° C, and the time may be in the range of 30 seconds to 60 minutes.

The electrodeposition coating obtained from the composition of the present invention is excellent in both anti-corrosive property and adhesiveness to the surface of the article, therefore the composition of the present invention can be used not only for the treatment of the metallic surface of article which is previously shaped, but also for the coil coating process of metal strip.

In order that the invention may be more fully understood, various examples will not be described in the following. Other combinations of and variations from these examples will no doubt occur to those skilled in the art. These are considered to be part of the invention.

In these examples, unless otherwise indicated, all parts and percentages are by weight.

EXAMPLES 1-11

Ten kinds of compositions for preparing electrodeposition coatings were made by the procedures as follows.

A mixture consisting of 85 parts of aqueous solution of acryic resin (trade name: Aron 4002, made by Toa Gosei Chemical Industry Co., Ltd., Japan, and resin solid content: 50%) and 15 parts of water soluble melamine-formaldehyde resin (trade name: Nikalac MX-40, made by Nippon Carbide Industries Co., Ltd., Japan), was diluted with deionized water to obtain 10% resin solid solution. Into the portion of the above obtained solution 0.3, 0.5% or 0.8% (on the basis of resin solids and in case of salt hydrate, calculated as a anhydride) of (1) potassium stannate: $K_2SnO_3.3H_2O$, (2) ammonium heptamolybdate: $(NH_4)_6Mo_7O_{24}.4H_2O$, (3) ammonium paratungstate: $(NH_4)_{10}W_{12}O_{41}$, (4) ammonium metavanadate: $NH_4VO_3$, or (5) borax (sodium tetraborate): $Na_2B_4O_7.10H_2O$, was added. After stirring the resin solution and dissolving of the above, each solution was adjusted to pH 8.0 with triethylamine to obtain 11 kinds of compositions. Each of the above compositions was poured into a metallic vessel, and a degreased aluminum plate of 0.8 mm in thickness was dipped into the composition. The aluminum plate was connected to the positive electrode, and then 50 volts of DC voltage was applied between said aluminum plate and said metallic vessel for 1 minute. The temperature during the electrodeposition was 30 ± 0.5° C.

The aluminum plates with the electrodeposited layers were then rinsed with water and baked for 20 minutes at 180° C. Thereby, a transparent and brilliant coating film on each aluminum test plate was obtained.

These coated plates were subjected to Erichsen film tests, bending tests and salt-spray tests, the results of which are, shown in the following Table 2.

EXAMPLE 12

To the aqueous solution of acrylic resin and melamine-formaldehyde resin which was used in Examples 1 to 10 was added with 0.4% (to resin solids) of potassium stannate: $K_2SnO_3.3H_2O$ calculated as anhydride, and 0.4% (to resin solids) of ammonium metavanadate: $NH_4VO_3$, and then the solution was adjusted to pH 8.0 with triethylamine to obtain a composition for electrodeposition. Tests were carried out in like manner as the foregoing Example 1, and the results are shown in the following Table 2.

Comparative Example 1-3

Using the same aqueous solution of acrylic resin and melamine-formaldehyde resin which was used in Examples 1 to 10, a comparative test was carried out in like manner as the foregoing Examples except that the oxyacid salt was added in an amount of 1.0%, 1.5% or not added and the electric voltage for electrodeposition was 60 volts. The test results of the coating thus obtained are shown in the following Table 2.

Comparative Examples 4-5

The aqueous solution of acryic resin and melamine-formaldehyde resin which was used in Examples 1 to 10 was adjusted to pH 8.0 with triethylamine to obtain a composition for electrodeposition. The above composition was poured into a metallic vessel, and each of two degreased steel plates of 0.8 mm in thickness was dipped into the composition. The steel plate was connected to the positive electrode, then 100 volts of DC voltage was applied between said steel plate and said metallic vessel for 1 minute.

One steel plate was removed promptly and then the wet plate was dipped into the above same composition except that ammonium heptamolybdate was added in an amount of 2.0% (on the basis of resin solids and in case of salt hydrate, calculated as an anhydride). Another steel plate was treated in like manner as above mentioned except that 1.5% of potassium stannate instead of ammonium heptamolybdate was added. DC voltage of 25 volts was applied for 30 seconds.

The steel plates with the electrodeposited layers was then rinsed with water and baked for 20 minutes at 180° C. The test result of the coating thus obtained are shown in the following table 2.

Table 2

| Example No. | Added Oxy-acid Salts Kind | Amount (%) | Film Thickness (micron) | *1 Ericksen Film Test | *2 Bending Test | *3 Salt-Spray Test 500 hrs. | 1000 hrs. | 1500 hrs. |
|---|---|---|---|---|---|---|---|---|
| Example 1 | $K_2SnO_3$ | 0.5 | 20 | 95 | Good A | 0 | 1.0 | 1.5 |
| Example 2 | $K_2SnO_3$ | 0.8 | 20 | 100 | Good A | 0 | 1.0 | 2.0 |
| Example 3 | $(NH_4)_6Mo_7O_{24}$ | 0.3 | 23 | 100 | Good A | 0 | 0.5 | 1.0 |
| Example 4 | $(NH_4)_6Mo_7O_{24}$ | 0.5 | 26 | 100 | Good A | 0 | 0.5 | 1.0 |
| Example 5 | $(NH_4)_6Mo_7O_{24}$ | 0.8 | 27 | 100 | Good A | 0 | 1.0 | 1.5 |
| Example 6 | $(NH_4)_{10}W_{12}O_{41}$ | 0.5 | 19 | 92 | Good B | 0 | 0.5 | 1.0 |
| Example 7 | $(NH_4)_{10}W_{12}O_{41}$ | 0.8 | 21 | 95 | Good A | 0 | 0.5 | 1.5 |
| Example 8 | $NH_4VO_3$ | 0.5 | 19 | 100 | Good A | 0 | 0.5 | 1.0 |
| Example 9 | $NH_4VO_3$ | 0.8 | 18 | 100 | Good A | 0 | 0.5 | 1.5 |
| Example 10 | $Na_2B_4O_7$ | 0.5 | 32 | 100 | Good A | 0 | 1.0 | 1.5 |
| Example 11 | $Na_2B_4O_7$ | 0.8 | 30 | 100 | Good A . | 0 | 0.5 | 1.5 |
| Example 12 | $K_2SnO_3, NH_4VO_3$ | Each 0.4 | 24 | 100 | Good A | 0 | 0.5 | 1.0 |
| Comparative Example 1 | $(NH_4)_6Mo_7O_{24}$ | 1.0 | 18 | 100 | Good A | 0 | 1.5 | 3.0 |
| Comparative Example 2 | $(NH_4)_6Mo_7O_{24}$ | 1.5 | 15 | 82 | Not Good | 1.0 | 2.0 | 3.5 |
| Comparative Example 3 | — | — | 20 | 81 | Not Good | 1.0 | 3.0 | 5.0 |
| Comparative Example 4 | $(NH_4)_6Mo_7O_{24}$ | 2.0 | 20 | 90 | Not Good | 1.0 | 2.5 | 4.0 |
| Comparative | | | | | | | | |

Table 2-continued

| Example No. | Added Oxy-acid Salts Kind | Amount (%) | Film Thickness (micron) | *1 Ericksen Film Test | *2 Bending Test | *3 Salt-Spray Test 500 hrs. | 1000 hrs. | 1500 hrs. |
|---|---|---|---|---|---|---|---|---|
| Example 5 | $K_2SnO_3$ | 1.5 | 19 | 85 | Not Good | 1.0 | 2.5 | 4.5 |

Notes:
*1 On the surface of the coating of the test plate, two sets of eleven notch lines having intervals of 1 mm perpendicular to each other which reach the surface of the substrate were formed by a knife. Thereby 100 of small squares were cut on the coating film. Then, the test plate which was formed with said cross-cut pattern was subjected to an Erichsen film tester where the plate was pressed down from the back side of the cut surface. The center of the cross-cut pattern and that of the deformation of the plate was coincided with each other. Thereafter, the cross-cut pattern was applied with self-adhesive tape (Scotch Tape) of 20 mm in width and pressed down to adhere tightly to the coating, then the self-adhesive tape was peeled off quickly, and the number of the cut squares remained on the test plate was counted, which is indicated in Table 2.

*2 A steel rod with circular section of 2 mm in diameter was attached to the back side of the test plate, and said test plate was bent around said rod with an angle of 180° for one second, then the state of the coating on the outside of the bent portion was observed. When cracks were formed and the surface of substrate was exposed, the result was indicated as "Not Good". In case the result was not so bad as the above, but some defect was observed when self-adhesive tape was applied to the bent portion and peeled off quickly, it was indicated as "Good B". After such test, if no defect of the coating film was observed, it was indicated as "Good A".

*3 Two straight notch lines in the form of "X" which reach the surface of substrate were cut by using a knife on the coating film of the test plate. The test plate was then sprayed with 5% sodium chloride aqueous solution using a salt-spray tester at a temperature of 35° C for 500 hours. Thereafter, self-adhesive tape was fixed along one of said notches and it was peeled off quickly to observe the defective portions of the coating film. The test result was indicated by the maximum width from the center line of the notch of the defective portion of the coating.

Then the same test plate was subjected to similar salt-spray test for further 500 hours (the total was 1000 hours), and still further 500 hours (the total 1500 hours) and the peeling off test was carried out with regard to the remaining notch line in like manner as the above.

EXAMPLE 13-15 and

Comparative Examples 6-8

The electrodeposition coating compositions as used in the above Example 1, Example 4 and Comparative Example 3 were employed as the compositions for these Examples, in which untreated mild steel plates, zinc galvanized steel plates and zinc phosphated steel plates of 0.8 mm in thickness were treated in like manner as the foregoing Examples. The results of the performance tests with regard to the obtained coating are shown in the following Table 3.

Table 3

| Example No. | Added Oxy-acid Salts | | Test Plate | Film Thickness (micron) | *4 Erichsen Film Test | *5 Impact Test | *6 Salt-Spray Test (mm) |
|---|---|---|---|---|---|---|---|
| Example 13 | $K_2SnO_3$ | 0.5% | Mild Steel, Untreated | 23 | 95 | 50 | 0.5 |
| Comparative Example 6 | — | | Mild Steel Untreated | 19 | 91 | 40 | 2.0 |
| Example 14 | $K_2SnO_3$ | 0.5% | Zinc Galvanized Steel | 21 | 70 | 50 | 0 |
| Comparative Example 7 | — | | Zinc Galvanized | 20 | 52 | 40 | 0.5 |
| Example 15 | $(NH_4)_6Mo_7O_{24}$ | 0.5% | Zinc Phosphated Steel | 26 | 100 | 50 | 0 |
| Comparative Example 8 | — | | Zinc Phosphated Steel | 23 | 10 | 40 | 0 |

Notes:
*4 Almost the same as *1 in Table 2 except that the depth of pressing was 7 mm.
*5 The du Pont impact tester has been used where an impact core of 12.7 mm in diameter and a weight of 500 g has been employed. The maximum height (cm) of the weight where no defection of the coating on the opposite side surface takes place, has been recorded, and is shown in the Table 3.
*6 Tested in like manner as *3 in Table 2, except that the duration of the spraying was 300 hours.

EXAMPLES 16-17

An epoxy resin type water dispersion (resin solids content: 20%) as prepared through the following method in an amount of 100 parts was added with 20 parts of 1% aqueous solution of potassium stannate or lithium molybdate, then the mixture was adjusted to pH 8.0 with aqueous solution of diethanolamine. Thereafter, the composition was diluted with water to obtain an electrodeposition coating composition of 10% in resin solids content.

A polished mild steel plate of 0.8 mm in thickness was immersed in each bath composition obtained in the above and was connected to the positive electrode, and then the electrodeposition was carried out with DC voltage of 80 volts for 2 minutes. After the electrodeposition, each of the test plates thus obtained was rinsed with water, and was baked at 160° C for 20 minutes to cure the coating film. Then, the test plates were subjected to the performance tests in like manner as in Examples 13-15, the results of which are shown in the following Table 4.

Preparation of Said Epoxy Resin Type Water Dispersion

A reaction vessel was fed with 40 parts of Epikote No. 828 (Trade name of epoxy resin, made by Shell Chemical Corp.) and 100 parts of linseed oil fatty acid, and esterification was carried out by heating at 230° C until the acid value of the reaction mixture became 10. Then this epoxy resin-fatty acid ester was added with 20 parts of maleic anhydride and the reaction was carried out at 180° C for 4 hours to obtain a maleinized epoxy resin-fatty acid ester. The acid value after the above reaction was about 140. Each of the above reactions was carried out in nitrogen gas atmosphere.

The maleinized epoxy resin-fatty acid ester thus obtained was partially neutralized by diethanolaine to make it water dispersible. Then it was dispersed into deionized water to obtain said epoxy resin type water dispersion (the raw material for the above-mentioned composition) of pH 7.8 and 20% in resin solid content.

Comparative Example 9

The epoxy resin type water dispersion as used in Examples 16–17, was again employed as an electrodeposition coating composition without adding any oxy-acid salts in like manner as in said Examples. Then, the electrodeposition was carried out by using the above composition in like manner as said in Examples except that the electric voltage was 100 volts. The test plate thus coated was subjected to the similar tests, the results of which are shown in the following Table 4.

EXAMPLES 18–19

A polybutadiene type water dispersion (resin solid content: 20%) as prepared through the following method in an amount of 100 parts was added with 20 parts of 1% aqueous solution of sodium tungstate or ammonium biborate, the mixed well and adjusted to pH 8.0 with triethanolamine. Then, they were diluted with water to obtain the electrodeposition coating composition of 10% in resin solid content.

A polished mild steel plate of 0.8 mm in thickness was immersed in each bath composition obtained in the above, and was connected to the positive electrode, and then the electrodeposition was carried out with DC voltage of 100 volts for 2 minutes at 30 ± 1° C. After the electrodeposition, each of the obtained test plates was rinsed with water, and was baked at 170° C for 20 minutes to cure the obtained coating film. Then the test plates were subjected to the performance tests in like manner as in Examples 13–15, the results of which are shown in the following Table 4.

Preparation of Said Polybutadiene Type Water Dispersion

A reaction vessel was fed with 100 parts of 1,2-type polybutadiene (number average molecular weight: 1200, 1,2- bond polymerized component: 89% and trans-1,4-bond polymerized component: 11%), 60 parts of linseed oil and 32 parts of maleic anhydride. The reaction with said maleic anhydride was carried out by heating at 200° C until the acid value of the product became about 170. Into 700 parts of the thus obtained reaction product, 76 parts of propylene glycol was added and ring-opening reaction of the acid anhydride groups (half-esterification) was carried out at 100° C until the acid value of the reaction product became 95. The obtained maleinized drying oil modified polybutadiene was partially neutralized with triethanolamine to make it water-dispersible, and it was dispersed in deionized water to obtain the polybutadiene type water dispersion of pH 7.8 and 20% in resin solids content. This was used for the raw material of the above-mentioned composition for electrodepostion coating.

Comparative Example 10

The polybutadiene type water dispersion as used in the foregoing Examples 18–19 was again employed as an electrodeposition coating composition without adding any oxy-acid salt. Then, the electrodeposition was carried out by using the above composition in like manner as said examples except that the electric voltage was 120 volts. The test plate thus coated was subjected to the similar tests, the results of which are shown in the following Table 4.

Table 4

| Ex. No. | Added Oxy-acid Salts | | Film Thickness (micron) | *7 Erichsen Film Test | *8 Impact Test | *9 Salt-Spray Test (mm) |
|---|---|---|---|---|---|---|
| Ex. 16 | $K_2SnO_3$ | 0.8% | 21 | 100 | 50 | 0 |
| Ex. 17 | $Li_2MoO_4$ | 0.5% | 22 | 100 | 50 | 0.5 |
| Comparative Ex. 9 | — | | 21 | 93 | 40 | 1.0 |
| Ex. 18 | $Na_2WO_4$ | 0.5% | 23 | 100 | 50 | 1.0 |
| Ex. 19 | $(NH_4)HB_4O_7$ | 0.5% | 20 | 100 | 50 | 0.5 |
| Comparative Ex. 10 | — | | 24 | 81 | 40 | 2.0 |

Notes: *7, *8 and *9 are the same as *4, *5 and *6 in Table 3, respectively.

What is claimed is:

1. A method for preparing electrodeposition coating on an uncoated metallic article which is characterized in that the article desired to be coated is first immersed into an aqueous bath consisting essentially of 4–10 weight percent of water soluble or water dispersible resin and 0.1 to 0.8% by weight (on the basis of resin solids content) of at least one water soluble oxyacid salt selected from the group consisting of stannates, molybdates, tungstates, vanadates and borates, said article is connected to the positive electrode and supplied with DC electric voltage in the range of 30 to 300 Volts for 30 seconds to 10 minutes, then said article is rinsed with water and dried, and heated at a temperature in the range of 130 to 300° C. for 30 seconds to 60 minutes to cure the resinous component in the obtained electrodeposition coating.

2. A method for preparing electrodeposition coating on an uncoated metallic article as claimed in claim 1, in which said water soluble or water dispersible resin is selected from the group consisting of epoxy resin, melamine-formaldehyde resin, alkyd resin, polyester, acrylic resin, polybutadiene, natural resin and fatty oil derivative.

3. A method for preparing electrodeposition coating on an uncoated metallic article as claimed in claim 1, in which said water soluble oxyacid salt is selected from the group consisting of lithium stannate, sodium stannate, potassium stannate, lithium molybdate, sodium molybdate, potassium polybdate, ammonium heptamolybdate, sodium phosphomolybdate, ammonium phosphomolybdate, lithium tungstate, sodium tungstate, potassium tungstate, sodium metatungstate, sodium paratungstate, ammonium pentatungstate, ammonium heptatungstate, sodium phosphotungstate, barium borotungstate lithium orthovanadate, sodium orthovanadate, lithium metavanadate, sodium metavanadate, potassium metavanadate, ammonium metavanadate, sodium pyrovanadate, lithium metaborate, lithium tetraborate, sodium metaborate, sodiium tetraborate, sodium decaborate, sodium perborate, sodium borate-hydrogen peroxide adduct, sodium boroformate, potassium metaborate, potassium tetraborate, ammonium tetraborate and ammonium biborate.

4. A metallic object electrocoated by the method of claim 1.

5. A method for preparing electrodeposition coating on an uncoated metallic article as claimed in claim 1, in which the amount of said oxy-acid salt is 0.3 to 0.8% by weight on the basis of resin solids content.

6. A method for preparing electrodeposition coating on an uncoated metallic article as claimed in claim 1, in which the steps of immersing the uncoated article into the aqueous bath and the application of electric voltage is effected at a temperature of 20° to 40° C.

7. A method for preparing electrodeposition coating on an uncoated metallic article as claimed in claim 6, in which the amount of said water soluble or water dispersible resin is in the range of 4 to 10% by weight.

8. A method for preparing electrodeposition coating on an uncoated metallic article as claimed in claim 7, in which the amount of said oxy-acid salt is 0.3 to 0.8% by weight on the basis of resin solids content.

* * * * *